United States Patent [19]

Matusz et al.

[11] Patent Number: 4,859,409
[45] Date of Patent: Aug. 22, 1989

[54] REACTOR VESSEL LOWER INTERNALS TEMPORARY SUPPORT

[75] Inventors: John M. Matusz, Plum Boro; Leonard R. Golick, Trafford; Walter Matusz, North Braddock Boro, all of Pa.

[73] Assignee: Westinghouse Electric Corp., Pittsburgh, Pa.

[21] Appl. No.: 199,416

[22] Filed: May 27, 1988

[51] Int. Cl.$^4$ ............................................. G21C 19/00
[52] U.S. Cl. .................................... 376/463; 376/263
[58] Field of Search ............... 376/262, 263, 261, 260, 376/461, 463

[56] References Cited

U.S. PATENT DOCUMENTS

| | | |
|---|---|---|
| 3,752,737 | 8/1973 | Frisch et al. |
| 3,801,454 | 4/1974 | Kumpf ............................ 376/463 |
| 3,836,429 | 9/1974 | Frisch et al. |
| 3,984,282 | 10/1976 | Kleimola. |
| 4,050,983 | 9/1977 | Kleimola. |
| 4,056,435 | 11/1977 | Carlier et al. |
| 4,077,840 | 3/1978 | Aubert ............................ 376/263 |
| 4,080,256 | 3/1978 | Braun et al. |
| 4,134,789 | 1/1979 | Aubert. |
| 4,158,599 | 6/1979 | Andrews et al. |
| 4,210,614 | 7/1980 | Kleimola ....................... 261/124 |
| 4,289,291 | 9/1981 | Goddard ........................ 376/262 |
| 4,302,290 | 11/1981 | Mazur et al. ................... 376/287 |
| 4,313,793 | 2/1982 | Klumb et al. .................. 376/260 |
| 4,427,621 | 1/1984 | Gillett et al. ................... 376/260 |
| 4,585,611 | 4/1986 | Perl ............................... 376/260 |
| 4,587,080 | 5/1986 | Johnson ......................... 376/282 |
| 4,705,661 | 11/1987 | Cransac et al. ................ 376/263 |

Primary Examiner—Brooks H. Hunt
Assistant Examiner—Daniel Wasil
Attorney, Agent, or Firm—Michael G. Panian

[57] ABSTRACT

A temporary support structure for supporting a lower internals assembly above the reactor vessel during inspection and/or maintenance thereof. A support bracket is bolted to the reactor vessel flange at the vessel head stud closure holes. A pivotally mounted arm, upon the top surface of which the internals rest, is attached at one end to the support bracket and projects radially inwardly therefrom. A compliant foot depends from the bottom of the opposite end of the arm and engages the vessel internals support ledge to provide a secure support structure for the internals assembly. An alignment bracket on the arm aligns the internals with the support. Four such structures are installed around the circumference of the vessel flange while the internals are within the reactor vessel. The structure allows the lower internals to be quickly removed from the interior of the reactor vessel and placed on the temporary supports. By supporting the internals above the vessel from the vessel flange, the lower internals remain essentially completely submerged by the shielding medium.

20 Claims, 4 Drawing Sheets

REACTOR VESSEL LOWER INTERNALS TEMPORARY SUPPORT

TECHNICAL FIELD

The invention relates to a lower internals assembly of a nuclear reactor pressure vessel, and more particularly to a temporary support structure for the lower internals assembly.

BACKGROUND OF THE INVENTION

In a nuclear reactor pressure vessel, reactor internals assemblies, normally in the form of both upper and lower internals, are used to support and orient reactor core fuel assemblies, utilized to generate heat for the production of steam and electricity, provide a passageway for reactor coolant, typically borated water, and support in-core instrumentation. One such structure is commonly referred to as the reactor lower internals and includes upper and lower core barrels, thermal shield, lower core plate, and various other structures and components to effectively provide for the above-stated objectives.

The lower internals are supported both from the top and bottom by the reactor vessel. At its top portion, the lower internals assembly includes an outwardly directed radial flange which engages an inwardly directed internals support ledge on the interior of the reactor vessel. The internals support ledge is part of the reactor vessel flange upon the top surface of which is sealingly engaged the reactor vessel closure head by a plurality of stud bolts, in a manner well known in the art. The lower end of the lower internals assembly is restrained from transverse movement by a radial support system attached to the vessel wall. This radial support system is achieved by a key and keyway arrangement. Typically, at a plurality of equally spaced points around its circumference, blocks are welded to the inside diameter of the reactor vessel, each of which has a keyway geometry. Opposite each of these blocks is a key which is attached to the lower end of the lower internals assembly. When the lower internals are installed within the reactor vessel, the keys engage the keyways in the axial direction to provide support at the bottom of the lower internals.

Occasionally the lower internals are removed from within the reactor vessel for inspection and/or maintenance thereof. Since an operating nuclear reactor generates an irradiated environment, which is safely protected within a containment building, borated water or other shielding medium is maintained over the irradiated components normally maintained within the interior of the reactor pressure vessel. Typically, when the lower internals are removed, the structure is transported to a location within the containment building and placed on a storage stand. Although the containment building defines a large interior space for the storage of reactor components during maintenance operations, a typical reactor lower internals structure is a relatively large component and may not be capable of being completely submerged when so stored. Because of this, large auxiliary shielding structures must be provided within the containment structure to safely protect maintenance personnel, and to lower overall man-rem exposure levels. Additionally, an improved reactor vessel lower internals storage area arrangement is disclosed in patent application Ser. No. 213,209, filed on June 29, 1988, and assigned to the present assignee. This arrangement comprises support ledges and columns for the upper internals and lower internals structures integrally formed within the floor and walls of the refueling cavity at the time of initial plant construction.

Whereas these structures can adequately protect maintenance personnel, their construction can be time consuming and costly for existing plants. Not only must a separate structure be provided for and housed within the containment building, it must be put in place prior to the commencement of the particular maintenance procedure. This adds to the time required for such procedures, and subtracts from the time during which the nuclear reactor power plant can be operating and generating electricity. It is highly desirable then, that a less expensive means be available for adequately shielding the nuclear reactor's lower internal assembly when it is removed therefrom.

DISCLOSURE OF THE INVENTION

It is the primary object of the present invention to provide a temporary support for a lower internals assembly of a nuclear reactor which allows the assembly to be essentially completely submerged under a shielding medium when removed from the vessel.

The above object, among others, is attained by the present invention, according to which, briefly stated, a support structure is provided for a lower internals assembly of a nuclear reactor pressure vessel having a vessel flange on its top portion, the vessel flange including a top surface with a plurality of circumferentially spaced threaded openings therein and a radially inwardly projecting internals support ledge. The lower internals support structure comprises a support bracket secured to the top surface of the vessel flange, an arm having a top and bottom surface, one end of the arm being secured to the support bracket so as to project radially inwardly therefrom, the top surface of the arm adapted to engage and support the lower internals. A foot depends from the bottom surface of the arm near the end opposite the one end and engages the internals support ledge. In this manner the lower internals assembly is supported above the reactor vessel from its flange so that the internals can be adequately submerged by the shielding medium.

BRIEF DESCRIPTION OF THE DRAWINGS

The invention will become more apparent by reading the following detailed description in conjunction with the drawings, which are shown by way of example only, wherein.

DESCRIPTION OF THE PREFERRED EMBODIMENT

Figure 1:
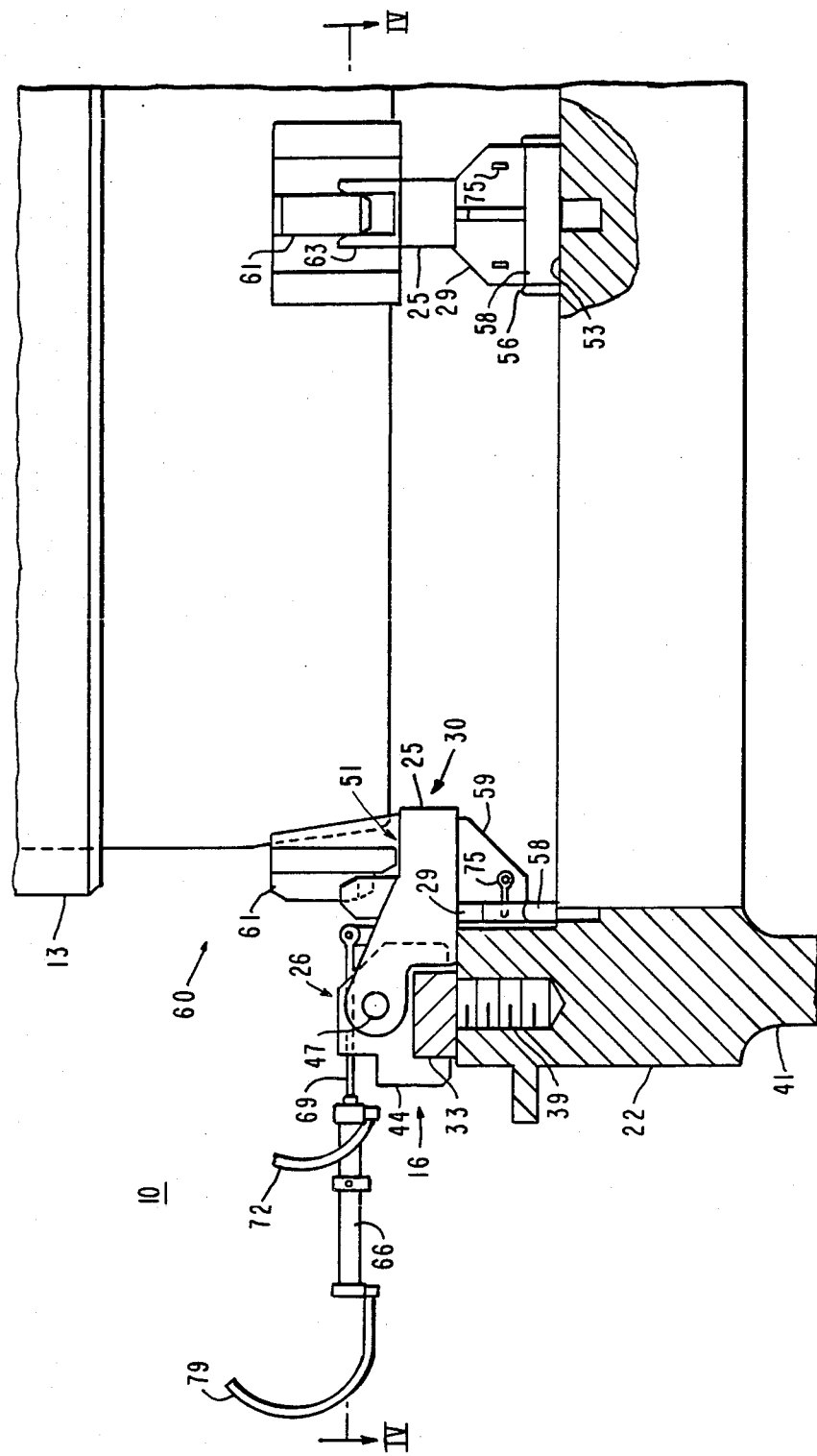
FIG. 1 is a partial side elevational view of a lower internals assembly supported above a reactor vessel by the device of the present invention.
Figure 2:
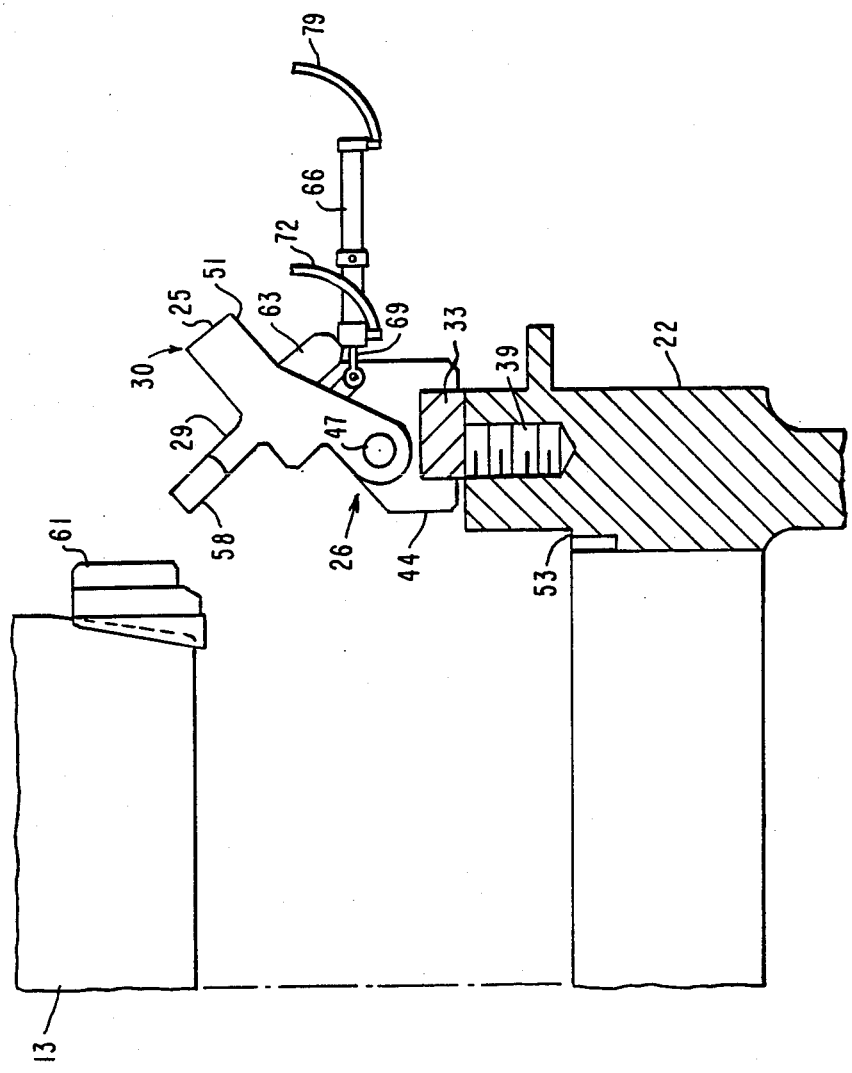
FIG. 2 is a partial side elevational view of the lower internals assembly suspended above the reactor vessel.
Figure 3:
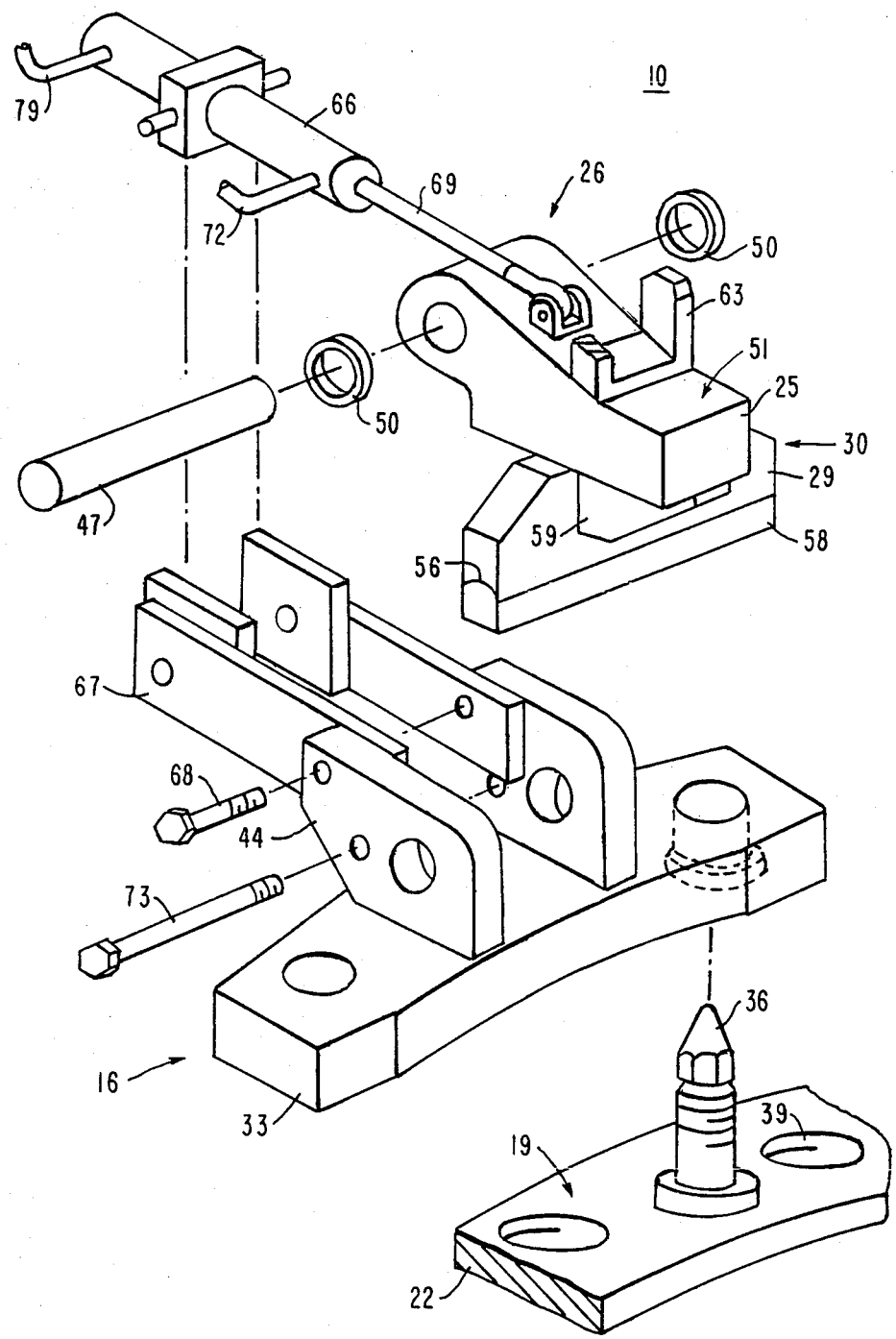
FIG. 3 is an exploded view of the device of the present invention.

Referring now to the drawings in detail, FIGS. 1 through 3 in particular, a temporary support structure 10 for a lower internals assembly 13 comprises a support bracket 16 secured to the top surface 19 of the reactor vessel flange 22, an arm 25 secured at one end 26 to the support bracket 16 so as to project radially inwardly therefrom, and a foot 29 depending downward from the bottom surface of the opposite end 30 the arm 25. The support bracket 16 includes a base plate 33 which is preferably secured to the top surface 19 of the reactor vessel flange 22 with two stud bolts 36 and nuts 37. The stud bolts 36 are threadingly engaged within threaded openings 39 of the vessel flange 22 used to seal the vessel head (not shown) to the reactor vessel 41. A clevis 44 is secured to the base plate 33 for pivotally securing the one end 26 of the arm 25 to the bracket 16. The arm 25 is pivotally mounted to the clevis 44 by a pin 47. The pin 47 is preferably laterally adjustable with respect to the bracket 16 and secured, such as by washers 50, so that the arm 25 can be properly positioned for receiving and supporting the lower internals assembly 13. The top surface 51 of the arm 25 near the opposite end 30 is adapted to engage and support the lower internals 13, whereas the foot 29 depending downward from the bottom surface of the arm 25 is designed to rest on the vessel internals support ledge 53 that normally supports the lower internals assembly 13 from its radial flange (not shown). Preferably, the foot 29 is of an arcuate shape so as to conform to the interior of a typical cylindrical reactor pressure vessel 41. The foot 29 includes a knuckle joint 56 to allow for compliance to assure uniform contact with the surface of the ledge 53. The knuckle joint 56 allows the bottom portion 58 of the foot 29 to rotate or pivot until it rests flat upon the vessel internals support ledge 53, matching the contour of that surface to assure adequate support for the lower internals. For additional support, a support member 59 may be provided between the arm 25 and the foot 29.

The lower internals assembly 13 is supported at its lower end 60 by a key 61 which engages a keyway (not shown) installed on the inside diameter of the reactor vessel 41. Similarly, the temporary support structure 10 includes an alignment bracket 63 on the upper surface of the arm 25 designed to engage the key 61 on the lower internals 13. When the lower internals assembly 13 is installed on the temporary support 10, the key 61 engages this bracket 63 and aligns the key 61 and the lower internals 13 with the support structure 10. Preferably, the temporary support structures are installed on the reactor vessel flange 22 at points directly above the keyways of the reactor vessel 41. In this manner, the lower internals assembly remains aligned with the reactor vessel when it is removed therefrom so that the lower internals can be quickly and easily reinstalled in proper alignment within the reactor vessel.

To provide for quick placement of the lower internals on the temporary support, the support structure 10 includes a means for pivotally rotating, the arm 25 upward and radially outward with respect to the support bracket 16 and the reactor vessel flange 22. Preferably, this rotating means comprises a hydraulic cylinder 66 attached to the support bracket 16 by a second bracket 67 secured thereto such as by bolt 68. The piston rod 69 thereof is secured near the one end 26 of the arm 25 so that, when the cylinder 66 is actuated by the introduction of hydraulic fluid through the appropriate fluid line 72, the piston rod 69 is translated in a radially outward direction from the vessel flange 22 to pivotally rotate the arm 25 away from the interior of the reactor vessel. This arrangement aids in the quick placement of the internals assembly on the support structure in a manner which will be more fully described hereinafter.

As a backup feature, one or more eyebolts 75 are provided on the support structure 10 so that the support arm 25 can be rotated back should the hydraulic cylinder, or other rotating means, fail. In the unlikely event of such failure, the eyebolts 75 can be engaged by a long handled tool (not shown) by maintenance personnel positioned on the operating deck of the reactor cavity. Once so engaged, the operator need merely pull up on the tool to pull the foot 29 out of contact with the vessel internals ledge 53 and rotate the arm 25 of the temporary support structure 10 radially outward from the reactor vessel flange 22.

The temporary support structure 10 of the present invention is preferably installed and utilized as follows: after the vessel head studs (not shown) are removed, pairs of support studs 36 are threaded into appropriate stud holes 39 at preferably four equally spaced locations above the radial support keys. Next, the vessel head (not shown) is lifted upward and removed by the plant's overhead crane and the reactor cavity is filled with a shielding medium, preferably in the form of flooding the reactor cavity with borated water. The reactor vessel's upper internals assembly (not shown) is removed and the fuel assemblies (not shown) are removed from the reactor vessel. While the lower internals 13 are still within the reactor vessel 41, each support structure 10 is lowered onto the previously installed studs 36 and fastened into the vessel flange 22 with nuts 37 threadingly engaged on the studs 36. Preferably after four such support structures 10 have been installed, the arms 25 of the support structures are pivotally rotated radially outward from the reactor vessel 41. Preferably, this is done by actuation of the hydraulic cylinder 66 by the introduction of hydraulic fluid into the fluid line 72 to draw the piston rod 69 in a radially outward direction. The support includes a second pin or bolt 73 through the clevis 44 adjacent to the pivot pin 47, to prevent the arm 25 from being rotated too far open. When all support structures have had their arms 25 similarly rotated back, the lower internals assembly 13 is then ready to be removed from the reactor vessel 41. Preferably, the lower internals are lifted just high enough to clear the lower end 60 of the lower internals 13 from the arms 25 of the support structures 10, as shown in FIG. 2. As the lower internals 13 are suspended there, the hydraulic cylinders 66 are actuated by the introduction of fluid into the second fluid line 79 to translate the piston and piston rod 69 radially inwardly to pivotally rotate the arms 25 of the support structures 10 radially inwardly such that the compliant foot 29 rests on the reactor vessel internals ledge 53. The knuckle joint 56 on each foot 29 allows it to match the contour of the vessel internals ledge 53 to provide for an adequate support surface. The lower internals assembly 13 is then lowered such that the keys 61 on the lower portion 60 thereof mate with the alignment brackets 63 on the arms 25 and the internals rest on the top surface 51 of the arms 25, as shown in FIG. 1. The lower internals assembly 13 is now securely supported above the reactor vessel 41 for the ensuing maintenance and/or inspection procedure.

With this support arrangement the lower internals assembly can be supported above the reactor vessel, which is situated within the floor of the reactor cavity, such that the lower internals are at all times essentially completely submerged by the borated water which floods the reactor cavity up to the level of the operating floor. As a consequence, a separate frame for the lower internals need not be provided within the reactor cavity. The need for the construction of an auxiliary shielding structure is also obviated due to the fact that the lower internals are essentially completely submerged by the shielding medium. Thus, the lower internals assembly can be readily removed from the reactor vessel and placed on a secure support structure, while submerged by the shielding medium, and any maintenance work that needs to be performed can be quickly completed.

By providing for a pivotally rotating support structure, the time that the lower internals assembly needs to be suspended above the reactor vessel (which may cause a portion of the lower internals to be momentarily lifted out of the borated water) is kept at a minimum. If the size of a particular plant's reactor cavity allows the lower internals assembly to be completely submerged even when it is suspended a relatively large height above the reactor vessel, a differing temporary support structure may be utilized. With this type of arrangement the support structure need not be capable of pivotally rotating radially outwardly from the center of the reactor vessel. As the lower internals assembly is supported above the vessel, a similar support structure not including the hydraulic cylinder or other rotating means can be installed on the reactor vessel flange. In such a power plant, adequate room may be provided for the installation of the support structure as the lower internals are suspended above the reactor vessel. Thus, the support structures can be installed on the reactor vessel flange such that they are in a position to receive the lower internals, and lower internals supported thereon hen the necessary support structures are securely bolted to the reactor vessel flange. However, the ability of the support structure to pivot radially outwardly from the reactor vessel is an important feature that allows the lower internals to be quickly and easily removed from the reactor vessel and placed on a secure support structure.

Figure 4:
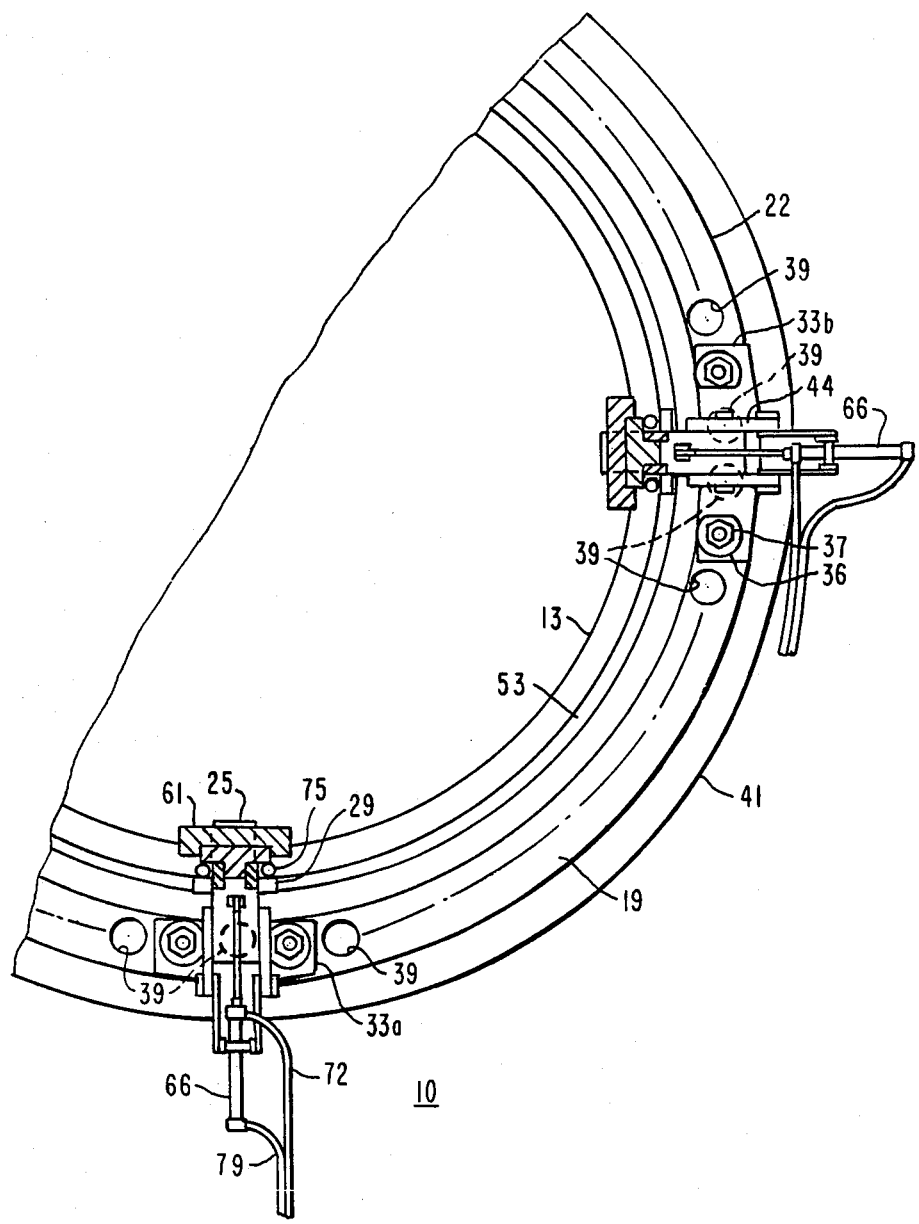
FIG. 4 is a partial top view of the reactor vessel having the support structures of the present invention installed on the reactor vessel flange, taken along the line IV—IV of FIG. 1.

As shown in FIG. 4, the support structures may take the form of two different type of supports Since the placement of the supports is determined by the placement of the key and keyways of the radially support system for the lower internals, the base plates which are secured to the reactor vessel flange may need to be constructed so as to be readily secured to the vessel flange by the existing stud holes. Preferably, the support structures are equally spaced at 90° intervals around the circumference of the reactor vessel flange, corresponding to locations of radial support keys. However, in some plants, the placement of the stud holes may not be symmetrical within 90° intervals of the reactor vessel flange. Therefore, the base plates of the support structures may come in pairs of differing dimension. Once such base plate 33a is designed to fit over three stud holes 39, with two studs 36 securely holding the base plate 53 and support structure 10 to the vessel flange 22. In the other type of base plate, the base plate 33b covers four such stud holes 39 and again two studs 36 being used to secure the base plate 33b and support bracket 16 to the vessel flange 22. However, the pivotally mounted arm 25 and foot 29 are substantially the same for each support structure 10. In this manner such support structures can be readily installed on differing designs of reactor vessels and can provide a secure support for such varying designs of lower internals structures as well.

While specific embodiments of the invention have been described in detail, it will be appreciated by those skilled in the art that various modifications and alterations would be developed in light of the overall teachings of the disclosure. Accordingly, the particular arrangements disclosed are meant to be illustrative, only and not limiting to the scope of the invention which is to be given the full breadth of the appended claims and in any and all equivalents thereof.

We claim:

1. In a nuclear reactor pressure vessel having a vessel flange on its upper portion, the vessel flange including a top surface, a plurality of circumferentially spaced threaded openings and a radially inwardly projecting internals support ledge, a lower internals assembly having a plurality of radially oriented keys on a lower end thereof, means for temporarily supporting the lower internals assembly above the reactor vessel comprising a plurality of support structures secured to the vessel flange, each of said support structures comprised of:

a support bracket secured to the top surface of the vessel flange;

an arm having a top and bottom surface, said arm pivotally secured near one end to the support bracket so as to project radially inward therefrom, the top surface of the arm adapted to engage said lower internals assembly near the lower end thereof;

means for pivotally rotating the arm with respect to the support bracket;

an arcuately shaped foot depending from the bottom surface of the arm near the end opposite the one end, said foot adapted to engage said internals support ledge; and alignment means on the top surface of the arm adapted to engage said keys for aligning said lower internals assembly with respect to said support means.

2. The lower internals support means as recited in claim 1, wherein the support bracket of each of said support structures includes a base plate securable to the top surface of the vessel flange by means of a stud bolt threadingly engaged within one of said threaded openings, and a clevis secured to the base plate for pivotally securing the arm to the support bracket.

3. The lower internals support means as recited in claim 2, wherein said means for pivotally securing the arm with respect to the support bracket of each of said support structures includes a pin attached to the one end of said arm and rotatably engaged within holes of the clevis.

4. The lower internals support means as recited in claim 3, wherein said means for pivotally rotating the arm of each of said support structures comprises an hydraulic cylinder attached to the support bracket, the piston rod of said hydraulic cylinder being attached to the arm such that the arm is pivotally movable about said pin when said hydraulic cylinder is actuated.

5. The lower internals support means as recited in claim 1, wherein the arcuately shaped foot of each of said support structures comprises two pivotally joined sections depending downward from the bottom surface of said arm.

6. The lower internals support means as recited in claim 1, wherein four of said support structures are secured to the vessel flange and radially oriented thereon at 90° with respect to each other.

7. The lower internals support means as recited in claim 4, wherein said support structures are made of stainless steel.

8. In a nuclear reactor pressure vessel having a lower internals assembly, and a vessel flange on its upper portion, the vessel flange including a top surface, a plurality of circumferentially spaced threaded openings and a radially inwardly projecting internals support ledge, a lower internals support structure comprising:
- a support bracket secured to the top surface of the vessel flange;
- an arm having a top and bottom surface, said arm pivotally secured near one end to the support bracket so as to project radially inward therefrom, the top surface of the arm adapted to engage the lower internals assembly; and
- a foot depending from the bottom surface of the arm near the end opposite the one end, said foot adapted to engage said internals support ledge.

9. The lower internals support structure as recited in claim 8, wherein the support bracket includes a base plate securable to the top surface of the vessel flange by means of a stud bolt threadingly engaged within one of said threaded openings, and a clevis secured to the base plate for pivotally securing the arm to the support bracket.

10. The lower internals support structure as recited in claim 9, further comprising a means for pivotally rotating the arm with respect to the support bracket.

11. The lower internals support structure as recited in claim 8, further comprising an alignment means on the top surface of the arm, said alignment means for aligning said lower internals assembly with respect to the support structure.

12. The lower internals support structure as recited in claim 10, wherein said means for pivotally rotating the arm comprises an hydraulic cylinder attached to the support bracket, the piston rod of said hydraulic cylinder being attached to the arm such that the arm is pivotally movable about the clevis when said hydraulic cylinder is actuated.

13. The lower internals support structure as recited in claim 8, wherein the foot further includes a compliant knuckle joint such that a bottom portion is pivotally mounted thereon.

14. A temporary support structure for a lower internals assembly of a nuclear reactor pressure vessel having a vessel flange on its upper portion, the vessel flange including a top surface, a plurality of circumferentially spaced threaded openings and a radially inwardly projecting internals support ledge, said lower internals assembly having a plurality of radially oriented keys on a lower end thereof, said support structure comprised of:
- a support bracket removably securable to the top surface of the vessel flange;
- an arm having a top and bottom surface, said arm pivotally secured near one end to the support bracket so as to project radially inward therefrom, the top surface of the arm adapted to engage said lower internals assembly near the lower end thereof;
- means for pivotally rotating the arm with respect to the support bracket;
- an arcuately shaped compliant foot depending from the bottom surface of the arm near the end opposite the one end, said foot adapted to engage said internals support ledge; and
- alignment means on the top surface of the arm adapted to engage said keys for aligning said lower internals assembly with respect to said support means.

15. The lower internals temporary support structure as recited in claim 14, wherein the support bracket includes a base plate removably securable to the top surface of the vessel flange by means of a stud bolt threadingly engaged within one of said threaded openings, and a clevis secured to the base plate for pivotally securing the arm to the support bracket.

16. The lower internals temporary support structure as recited in claim 15, wherein said means for pivotally securing the arm with respect to the support bracket of said support structure includes a pin attached to the one end of said arm and rotatably engaged within holes of the clevis.

17. The lower internals temporary support structure as recited in claim 16, wherein said means for pivotally rotating the arm of said support structure comprises an hydraulic cylinder attached to the support bracket, the piston rod of said hydraulic cylinder being attached to the arm such that the arm is pivotally movable about said pin when said hydraulic cylinder is actuated.

18. The lower internals temporary support structure as recited in claim 17, wherein the arcuately shaped foot of said support structure comprises two pivotally joined sections depending downward from the bottom surface of said arm.

19. The lower internals temporary support structure as recited in claim 18, wherein said support structure is made of stainless steel.

20. The lower internals temporary support structure as recited in claim 14, wherein the arcuately shaped foot of said support structure comprises two pivotally joined sections depending downward from the bottom surface of said arm.

* * * * *